United States Patent
Butera et al.

(10) Patent No.: US 8,899,829 B1
(45) Date of Patent: Dec. 2, 2014

(54) TEMPERATURE-SENSITIVE LABEL

(71) Applicant: SAES Getters S.P.A., Lainate (IT)

(72) Inventors: Francesco Butera, Como (IT); Stefano Alacqua, Como (IT); Luca Fumagalli, Muggio (IT)

(73) Assignee: SAES Getters S.p.A., Lainate (MI) (IT)

( * ) Notice: Subject to any disclaimer, the term of this patent is extended or adjusted under 35 U.S.C. 154(b) by 0 days.

(21) Appl. No.: 14/366,157

(22) PCT Filed: Feb. 20, 2013

(86) PCT No.: PCT/IB2013/051372
§ 371 (c)(1),
(2), (4) Date: Jun. 17, 2014

(87) PCT Pub. No.: WO2013/124796
PCT Pub. Date: Aug. 29, 2013

(30) Foreign Application Priority Data

Feb. 24, 2012 (IT) .................................. MI12A0273

(51) Int. Cl.
*G01K 5/70* (2006.01)
*G01K 3/00* (2006.01)
*G01K 13/00* (2006.01)
*G01K 5/48* (2006.01)
*G01K 1/02* (2006.01)

(52) U.S. Cl.
CPC ............... *G01K 3/005* (2013.01); *G01K 13/00* (2013.01); *G01K 5/483* (2013.01); *G01K 1/024* (2013.01)
USPC .......................................... 374/188; 374/208

(58) Field of Classification Search
USPC .............................. 374/188, 208; 73/801, 818
See application file for complete search history.

(56) References Cited

U.S. PATENT DOCUMENTS

| 4,114,559 | A | | 9/1978 | Rogen | |
|---|---|---|---|---|---|
| 5,209,568 | A | * | 5/1993 | Buffard et al. | 374/49 |
| 5,478,665 | A | * | 12/1995 | Burroughs et al. | 429/90 |
| 5,707,152 | A | * | 1/1998 | Krywitsky | 374/208 |
| 6,565,678 | B2 | * | 5/2003 | Fairchild et al. | 148/336 |
| 6,612,739 | B2 | * | 9/2003 | Shahinpoor | 374/205 |
| 6,837,620 | B2 | | 1/2005 | Shahinpoor | |
| 6,848,390 | B2 | * | 2/2005 | Akers et al. | 116/216 |
| 6,916,159 | B2 | * | 7/2005 | Rush et al. | 417/321 |

(Continued)

FOREIGN PATENT DOCUMENTS

FR       2664383      1/1992
IT     MI2011000499     9/2012

*Primary Examiner* — Lisa Caputo
*Assistant Examiner* — Nasir U Ahmed
(74) *Attorney, Agent, or Firm* — Steinfl & Bruno, LLP

(57) ABSTRACT

A temperature-sensitive label is described. The temperature-sensitive label has a temperature-sensitive system having a filiform shape memory member that has a first end portion having a terminal part fixedly secured to a first contact member, a second end portion having a terminal part restrained by a second contact member in a non-permanent way, and a central curved portion. The central curved portion is in the martensitic phase while the first and second portions are in the austenitic phase at a same environmental temperature above a critical threshold temperature to be monitored by the label such that in case of exposure to a temperature lower than the preset critical threshold temperature the end portions of the filiform shape member perform a phase transition, from austenitic phase to martensitic phase, which causes its irreversible disengagement from the restraint formed by the second contact member. The disengagement condition is optionally visible, for example, through a transparent window and/or monitored by an RFID system.

9 Claims, 2 Drawing Sheets

(56) References Cited

U.S. PATENT DOCUMENTS

Figure 1A:
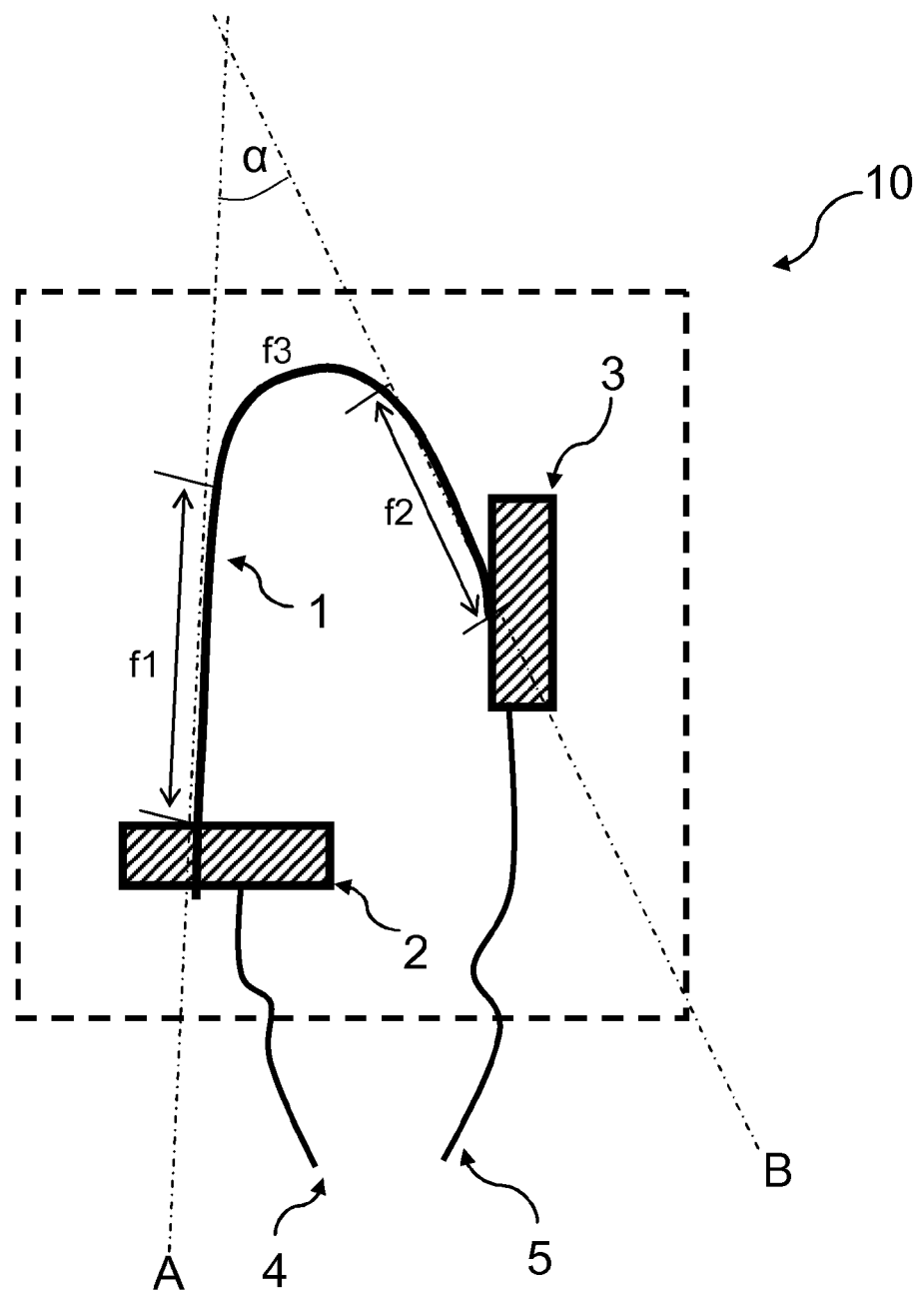

| | | | |
|---|---|---|---|
| 6,977,123 B1 * | 12/2005 | Burroughs et al. | 429/92 |
| 7,604,398 B1 * | 10/2009 | Akers et al. | 374/102 |
| 2003/0103553 A1 * | 6/2003 | Shahinpoor | 374/205 |
| 2007/0276638 A1 * | 11/2007 | Borchers et al. | 703/6 |
| 2014/0001273 A1 | 1/2014 | Cattaneo et al. | |

* cited by examiner

TEMPERATURE-SENSITIVE LABEL

CROSS REFERENCE TO RELATED APPLICATIONS

The present application is the US national stage of International Patent Application PCT/IB2013/051372 filed on Feb. 20, 2013 which, in turn, claims priority to Italian Patent Application MI2012A000273 filed on Feb. 24, 2012.

The present invention relates, in a first aspect thereof, to a temperature-sensitive label capable of indicating whether the item on which it is applied was exposed, even only for a short period of time, to a temperature below a minimum temperature threshold.

In the pharmaceutical field there is the known need of a constant and precise monitoring of the storage and transport conditions of medicines, which allows to guarantee that they are not modified in their chemical and physical characteristics and are therefore capable of preserving their functional properties and can not provoke possible undesired side effects when performing their therapeutical activity.

Medicines, with particular reference to those packaged in bottles, are generally stored in boxes which in turn are gathered in groups, for example on pallets. These pallets are usually transported from the manufacturing site to the distribution center located in the destination area, where the pallet is divided into the various boxes or single bottles so as to allow the delivery to the client, in this specific case for example hospitals, pharmacies, etc.

It is therefore particularly important that each bottle is controlled as to the risk of exposure to undesired temperatures. For many medicines it is fundamental that they are not exposed to a temperature below a minimum temperature threshold, same as a maximum temperature not to be exceeded during their whole commercial life, in that a freezing thereof would however have undesired effects on their therapeutical capacity. The typical suitable range for the storage of said products is in fact considered to be between the temperatures of 2° C. and 8° C.

This problem of controlling the temperature during the storage and transport of the products is not however limited to the pharmaceutical field. Other fields interested in that can be, for example, food, biotechnologies, botanics, chemistry.

Although various technical solutions have already been developed to monitor the temperature of these kind of substance or materials, they are essentially focused on the indication of the exceeding of a maximum temperature threshold in an effective and timely manner. Conversely, the effective control of minimum temperature threshold has not yet been adequately solved.

It is of particular interest to find a solution suitable for application on single items, even of small size, without particular limitations caused by the shape of the item whose temperature is to be monitored. In other words, the problem could be effectively solved by developing a sensitive member in the form of a label, i.e. a member of small bulkiness as well as adaptable to various surfaces, possibly also not flat, of the item on which it will be applied.

U.S. Pat. No. 4,114,559 disclosed a device that allows the monitoring of the exposure to temperatures above the desired temperature. Its operation is based on a bendable member made from a shape memory alloy, selected among those known in the field also as SMA (from Shape Memory Alloy), that acts as a member capable of responding to temperature. Said SMA member is in its martensitic phase at ambient temperature and acts as a mobile member for displaying the exposure to temperatures above the desired temperature as consequence of its transition to the austenitic phase.

A different solution is disclosed in U.S. Pat. No. 6,837,620 showing a sensor suitable to indicate the exposure, even temporarily, to temperatures below a preset critical temperature. It exploits the transition from the austenitic phase to the martensitic phase of a SMA wire associated with a bias, that can be either a spring or another resilient member. Said resilient member, which is the bias applied to the SMA wire, is also described as being capable of assuring the non-return of the sensitive member to its starting position, thus allowing to maintain the indication of the occurrence of the undesired event even when the temperature has returned to acceptable values.

However also in this case there are disclosed solutions that are difficult to adapt to configurations of the "label" type and, especially, unsuitable in view of a large scale use. In fact, one of the proposed embodiments provides the use of a spring as bias member with consequent limitations in terms of miniaturisation of the system, whereas the second embodiment presents a system for moving the visual display member that would not be suitable, without substantial modifications, to be put into communication with a control microprocessor suitable for remote monitoring.

The Italian Patent Application MI2011A000499 in the applicant's name discloses a temperature-sensitive label capable of visually displaying the exposure to temperatures below a threshold temperature $T_c$ set as critical and that can optionally be integrated with remote monitoring systems. It consists of a label comprising at least one temperature-sensitive system made up of a filiform shape memory member restrained to a filiform bias member provided with a seat preferably formed by bending back the filiform bias member, one of the ends of the filiform shape memory member being introduced in said seat in such a way that in case of exposure to a temperature lower than the critical threshold temperature $T_c$ the shape memory member performs a phase transition, from austenitic phase to martensitic phase, which reduces its strength and causes its irreversible disengagement from the restraint. This temperature-sensitive label, anyway, is affected by the limits related to coupling two filiform elements (the SMA wire and the filiform bias element) and in particular by the possibility of undesired decoupling also as a consequence of extraordinary mechanical stress that could occur during the transport.

The present invention allows to overcome the limits of the prior art to obtain temperature-sensitive labels capable of visually and reproducibly displaying the exposure to temperatures below a threshold temperature $T_c$ set as critical and that can optionally be integrated with remote monitoring systems.

In order to achieve said object the invention consists of a label comprising at least one temperature-sensitive system made up of a bent shape memory filiform member (i.e. a curved SMA wire), said filiform member having a first end portion consisting of a linear portion fixedly secured to a first contact member, a second end portion consisting of another linear portion restrained by a second contact member and a central curved portion between said first and second end portions, said shape memory filiform member being further characterized by the fact that its central curved portion is in the martensitic phase whereas the linear portions corresponding to the first and second ends are in the austenitic phase.

In the following, labels will be explicitly described which include only one temperature-sensitive system comprising a shape memory member and two contact members as respective end restraints, yet it is clear that what is being said is also applicable to labels including a greater number of temperature-sensitive systems that therefore allow to perform an alert function not only with respect to a single minimum threshold critical temperature, but with respect to more different temperatures that can be critical depending on the specificity of the product to be monitored on which the label is applied.

Figure 1B:
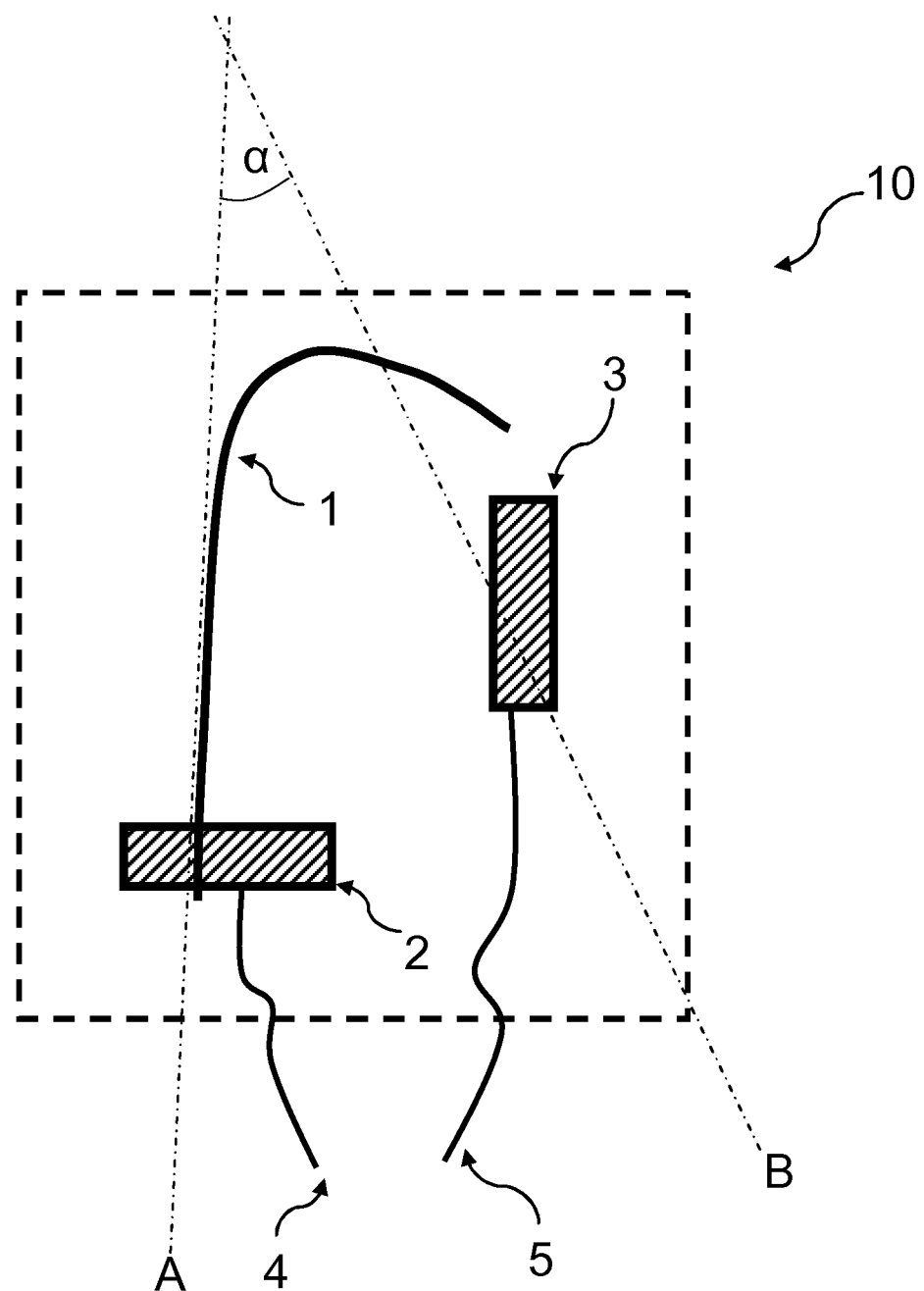

The invention will be described in detail hereafter through a general embodiment thereof, provided as non-limiting example, with reference to the following figures:

FIG. 1a depicts in a schematic way the temperature-sensitive system consisting of a bent shape memory member at room temperature FIG. 1b depicts in a schematic way the temperature-sensitive system of FIG. 1a after exposure to a temperature below the critical temperature to be monitored.

Referring to said figures, there is seen that the invention essentially consists of a temperature-sensitive system 10 comprising a bent shape memory filiform member 1, preferably a SMA wire, restrained to two contact members 2, 3. The filiform member 1 is fixedly connected to a first contact member 2 whereas the connection to the second contact member 3 is not permanent. Both contact members 2 and 3 can be optionally coupled with electrical contacts (respectively 4 and 5) suitable to connect the temperature-sensitive system to an electrical or electronic circuit allowing the remote temperature monitoring.

Differently from the solutions described in the prior art or available in the market, the shape memory filiform member 1 is not entirely in the same transitional phase: a first linear end portion f1 lying along a first direction A and a second linear end portion f2 lying along a second direction B are in the austenitic phase, whereas a central curved portion f3 connecting said first portion f1 with said second portion f2 is in the martensitic phase ("lying along" means that portions f1, f2 are substantially straight, i.e. they do not form at any point an angle greater than 10° with direction A, B respectively). The coexistence of both possible transitional phases in the same filiform member 1 is the key feature enabling a correct operation of the temperature-sensitive system according to the present invention.

The contact restraint between members 1 and 3 is guaranteed, at temperature conditions above the critical threshold temperature $T_c$, by the curvature of the central portion f3 as represented in FIG. 1a.

As shown in FIG. 1b, when exposed to a temperature below the critical threshold temperature $T_c$, even temporarily, the linear end portions f1, f2 of the shape memory member 1, originally in the austenitic phase, go to the martensitic phase and, as a consequence, their resistance decreases causing the disengagement of portion f2 from the restraint with the contact member 3. The filiform member 1 is therefore free to irreversibly take its final position which resides in the absence of contact with the second contact member 3, i.e. a different spatial arrangement thereof.

The coexistence of two transitional phases can be obtained during the manufacturing process of the temperature-sensitive system starting from a shape memory wire completely in the austenitic phase: the transition to the martensitic phase can be induced by a localized bending at its predefined central portion, i.e. as an effect of a stress-strain deformation. On the contrary, the austenitic phase is maintained in the end portions of the wire not directly affected by the bending.

The invention provides, in its preferred embodiment, that the shape memory member 1 is made of a SMA selected among common shape memory alloys, among which particularly preferred are the nickel- and titanium-based alloys commonly known as Nitinol. As to the dimensional characteristics, it is preferred to use wires with a length between 1 and 100 mm, most preferably between 2 and 50 mm, and a diameter preferably comprised between 15 and 1000 μm.

In its preferred embodiment, the length of the curved portion f3 of the SMA wire 1 used in the present invention is comprised between 1 and 40% with respect to the overall length of the SMA wire, most preferably between 1 and 30%.

Furthermore, it is preferred that the angle α between direction A and direction B, respectively corresponding to the first and second linear portions f1 and f2 of the filiform element 1, is smaller than 130°.

Optionally the label containing the temperature-sensitive system of the present invention is designed so as to provide an optical flag Moreover, most of the goods distribution system bases its efficiency on the use of devices capable of monitoring the product to be moved during its whole life and, if possible, in real time and from remote. Such a monitoring, in general, is based on the use of radio-frequency devices applicable on different items, commonly known in the field as RFID labels (from Radio Frequency IDentification). It is therefore particularly advantageous that the solution for monitoring a possible minimum temperature threshold could be integrated with this type of system, i.e. the disengagement condition between filiform member 1 and contact member 3 is not only visible, for example through a transparent window or an optical flag, but also monitored by an RFID system.

The label according to the invention can be easily integrated with RFID systems when the SMA member 1 and the contact members 2, 3 are made of an electrically conductive material such that they can be coupled to electrical connections 4 and 5. These electrical connections 4, 5 reach the periphery of the label where they can be used as electrical contacts to close a branch of an electric circuit connected for example to the RFID system, providing a signal that can be managed and interpreted by an integrated microcircuit (microchip).

In the safety state, i.e. as long as the temperature remains above the critical threshold $T_c$, the microcircuit is characterized by the electrical closure of the circuit branch comprising the SMA member. On the contrary, whenever an exposure to a temperature below said threshold should occur, this circuit will open providing in real time the information about the alert state to the microcircuit to which said electrical branch is connected.

It should be noted that the electrical contacts arranged in the peripheral region of the label coupled with the integrated microcircuit can be made of a conductive material different from that making up the SMA member and/or the contact members, allowing to achieve said integration through conventional techniques useful for the purpose, such as for example welding or crimping.

In an alternative embodiment of the present invention, the monitoring label can contain more than one temperature sensitive system similar to that shown in FIGS. 1a and 1b, wherein each system allows the monitoring of a different critical temperature not to be exceeded.

The invention claimed is:
1. A temperature-sensitive label, comprising:
   at least one temperature-sensitive system comprising,
      a filiform shape memory member that has a first end portion lying along a first direction and a second end portion lying along a second direction and a central curved portion connecting said first portion with said second portion, the first portion having a terminal part fixedly secured to a first contact member and the second portion having a terminal part restrained by a second contact member in a non-permanent way, wherein said central curved portion is in the martensitic phase and the first and second portions are in the austenitic phase at a same temperature above a critical threshold temperature to be monitored by the label, the central curved portion having a first temperature behavior and the first and second portions each having a second temperature behavior that is different from the first temperature behavior of the central curved portion.

2. The temperature-sensitive label according to claim 1, wherein the angle between the first direction and the second direction is smaller than 130°.

3. The temperature-sensitive label according to claim 1, wherein said filiform shape memory member has a length between 1 mm and 100 mm, preferably between 2 mm and 50 mm.

4. The temperature-sensitive label according to claim 1, wherein said filiform shape memory member has a diameter between 15 μm and 1000 μm.

5. The temperature-sensitive label according to claim 1, wherein the length of the central curved portion of the filiform shape memory member is comprised between 1% and 40% with respect to the overall length, preferably between 1% and 30%.

6. The temperature-sensitive label according to claim 1, further comprising at least an optical flag or a transparent window adapted to display the condition of the temperature-sensitive system.

7. The temperature-sensitive label according to claim 1, further comprising electrical connections extending between the contact members and the periphery of the label.

8. The temperature-sensitive label according to claim 7, wherein the electrical connections are integrated to a circuit suitable to be used in radio-frequency identification (RFID) monitoring.

9. The temperature-sensitive label according to claim 1 further comprising more than one temperature-sensitive system, each one having a filiform shape memory element with a different transition temperature between its austenitic and martensitic phases.

* * * * *